(12) United States Patent
Tang

(10) Patent No.: US 12,741,595 B2
(45) Date of Patent: Sep. 22, 2026

(54) ROBOT

(71) Applicant: SHENZHEN PUDU TECHNOLOGY CO., LTD., Shenzhen (CN)

(72) Inventor: Lei Tang, Shenzhen (CN)

(73) Assignee: SHENZHEN PUDU TECHNOLOGY CO., LTD., Shenzhen (CN)

( * ) Notice: Subject to any disclaimer, the term of this patent is extended or adjusted under 35 U.S.C. 154(b) by 336 days.

(21) Appl. No.: 18/567,506

(22) PCT Filed: Nov. 17, 2022

(86) PCT No.: PCT/CN2022/132562

§ 371 (c)(1),
(2) Date: Dec. 6, 2023

(87) PCT Pub. No.: WO2023/088363

PCT Pub. Date: May 25, 2023

(65) Prior Publication Data

US 2024/0262297 A1 Aug. 8, 2024

(30) Foreign Application Priority Data

Nov. 17, 2021 (CN) ........................ 202122828498.9

(51) Int. Cl.
*B60R 11/02* (2006.01)
*A47L 11/40* (2006.01)
*B60R 11/00* (2006.01)

(52) U.S. Cl.
CPC ....... *B60R 11/0229* (2013.01); *A47L 11/4061* (2013.01); *B60R 2011/0043* (2013.01)

(58) Field of Classification Search
CPC .... A47L 9/32; A47L 2201/04; A47L 11/4061; A47L 2201/00; A47L 11/00; B25J 11/0085; B60N 3/02; B60R 11/0229
(Continued)

(56) References Cited

U.S. PATENT DOCUMENTS 8,296,899 B2 * 10/2012 Veenstra ................. A47L 9/009 15/340.1
D720,900 S * 1/2015 Hickmott ....................... D32/21
(Continued)

FOREIGN PATENT DOCUMENTS

CN 204445696 U 7/2015
CN 107374844 A 11/2017
(Continued)

OTHER PUBLICATIONS

Machine Translation of CN212193157, Jan. 5, 2026.*
(Continued)

*Primary Examiner* — Jason S Morrow
(74) *Attorney, Agent, or Firm* — OPENPTO US LLC; Yuhao Liang

(57) ABSTRACT

A robot includes: a robot body; a first support, which is mounted within the robot body; an armrest assembly, which comprises a connector, an armrest body that is provided at one end of the connector, and a first assembly end that is provided at the other end of the connector; a turnover mechanism, which comprises a first shaft, wherein the first shaft connects the first assembly end to the first support, the armrest body and the connector may be turned over relative to the robot body around the axis of the first shaft, the armrest assembly being used so that the armrest body moves away from the robot body when in a first turnover position, and the armrest body being used so that the armrest body and the connector are attached to the robot body when in a second turnover position.

8 Claims, 14 Drawing Sheets

(58) Field of Classification Search
USPC .......................................................... 296/1.02
See application file for complete search history.

(56) References Cited

U.S. PATENT DOCUMENTS

| | | | | |
|---|---|---|---|---|
| 9,427,127 | B2 * | 8/2016 | Dooley | A47L 11/284 |
| 9,980,618 | B2 * | 5/2018 | Koura | A47L 9/32 |
| 9,999,328 | B2 * | 6/2018 | Vanderstegen-Drake | A47L 5/30 |
| 10,292,554 | B2 * | 5/2019 | Lewis | A47L 9/009 |
| 10,342,400 | B2 * | 7/2019 | Nam | A47L 11/4061 |
| 12,070,170 | B2 * | 8/2024 | Mingee | A47L 11/4041 |
| 12,440,076 | B2 * | 10/2025 | Zasoba | A47L 7/0019 |
| 2006/0137129 | A1 * | 6/2006 | Schroter | A47L 9/26<br>15/323 |
| 2011/0203072 | A1 | 8/2011 | Veenstra | |
| 2013/0087393 | A1 * | 4/2013 | Vanderstegen-Drake | B60L 53/14<br>180/9.1 |
| 2015/0128996 | A1 * | 5/2015 | Dooley | A47L 11/4083<br>15/98 |
| 2016/0000282 | A1 | 1/2016 | Vanderstegen-Drake | |
| 2023/0135665 | A1 * | 5/2023 | Pfingsten | A47L 11/4061<br>15/49.1 |
| 2025/0319586 | A1 * | 10/2025 | Lv | B25J 1/02 |

FOREIGN PATENT DOCUMENTS

| | | | | |
|---|---|---|---|---|
| CN | 109515509 | A | 3/2019 | |
| CN | 208773607 | U | 4/2019 | |
| CN | 212193157 | U | 12/2020 | |
| CN | 212332720 | U | 1/2021 | |
| CN | 213940596 | U | 8/2021 | |
| CN | 216932958 | U | 7/2022 | |
| CN | 216940699 | U | 7/2022 | |
| CN | 216940700 | U | 7/2022 | |
| EP | 3922156 | A1 * | 12/2021 | A47L 11/24 |
| JP | H0747039 | | 2/1995 | |
| JP | H07327888 | | 12/1995 | |
| JP | 2016102379 | | 6/2016 | |
| WO | WO2015073187 | A1 | 5/2015 | |

OTHER PUBLICATIONS

Machine Translation of CN208773607, Jan. 5, 2026.*

PCT International Search Report, mailed Feb. 9, 2023, and Written Opinion, mailed Feb. 10, 2023, (with English translations) for corresponding PCT Application No. PCT/CN2022/132562, 15 pages.

Extended European Search Report for corresponding Application No. EP22894894.9, dated Nov. 5, 2024, 10 pages.

* cited by examiner

ROBOT

CROSS-REFERENCE TO RELATED APPLICATIONS

The present disclosure is an U.S. national phase application under 35 U.S.C. § 371 based upon international patent application No. PCT/CN2022/132562, filed on Nov. 17, 2022, which itself claims priority of Chinese Patent application No. 202122828498.9, filed on Nov. 17, 2021, entitled "ROBOT". The contents of the above identified applications are hereby incorporated herein in their entireties by reference.

TECHNICAL FIELD

The present disclosure relates to the technical field of robots, in particular to a robot.

BACKGROUND

Robots can improve sanitation and help people save time and energy. Traditional robots are controlled manually. Handrails are usually provided on a top portion of the robot's exterior to assist users in moving the robot body to complete various tasks. However, the handrails of traditional robots are fixed and cannot be freely adjusted, and the structure of the existing handrails usually takes up a large space, so that the manufacturing cost is high.

SUMMARY

According to various embodiments of the present disclosure, a robot is provided.

A robot includes a robot body, a first bracket, a handrail assembly, and a turning mechanism. The first bracket is mounted in the robot body. The handrail assembly includes a connecting member, a handrail body provided at an end of the connecting member, and a first assembly end provided at another end of the connecting member. The turning mechanism includes a first shaft, the first shaft is connected to the first assembly end and the first bracket, the handrail body and the connecting member are capable of turning around an axis of the first shaft relative to the robot body. When the handrail assembly is in a first turning position, the handrail body is away from the robot body, and when the handrail body is in a second turning position, the handrail body and the connecting member are attached to the robot body.

The above-mentioned robot includes a robot body, a first bracket, a handrail assembly, and a turning mechanism. The first bracket is mounted in the robot body. The handrail assembly includes a connecting member, a handrail body provided at an end of the connecting member, and a first assembly end provided at another end of the connecting member. The turning mechanism includes a first shaft, the first shaft is connected to the first assembly end and the first bracket, the handrail body and the connecting member are capable of turning around an axis of the first shaft relative to the robot body. When the handrail assembly is in a first turning position, the handrail body is away from the robot body to facilitate an operator to push the robot to move, and when the handrail body is in a second turning position, the handrail body and the connecting member are attached to the robot body, thereby realizing the turning of the handrail assembly, and the problem of the handrail assembly occupying a large space is solved.

Details of one or more embodiments of the present disclosure are set forth in the following drawings and descriptions. Other features, objects and advantages of the present disclosure will become apparent from the description, drawings and claims.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

Figure 1:
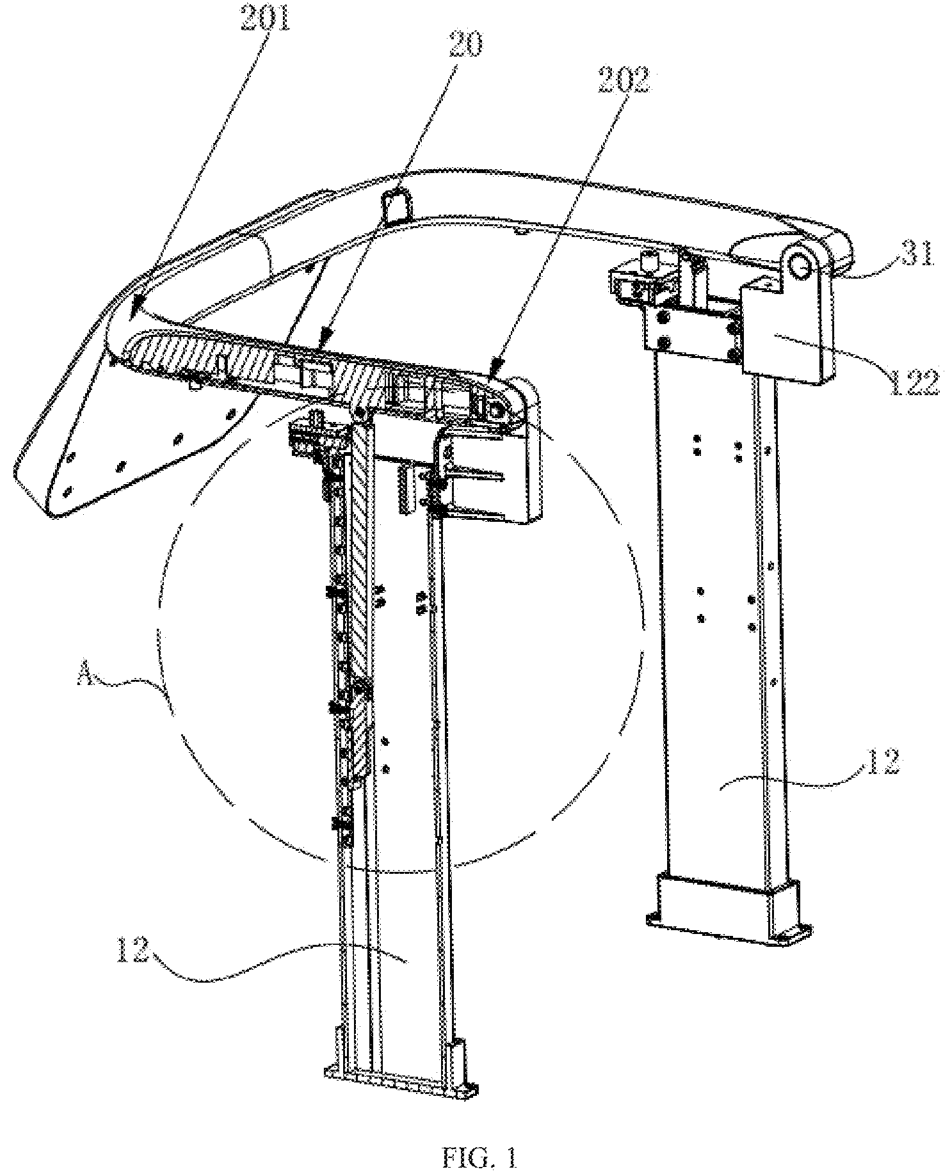
FIG. 1 is a perspective view of a handrail assembly according to an embodiment of the present disclosure viewed from a first aspect.
Figure 2:
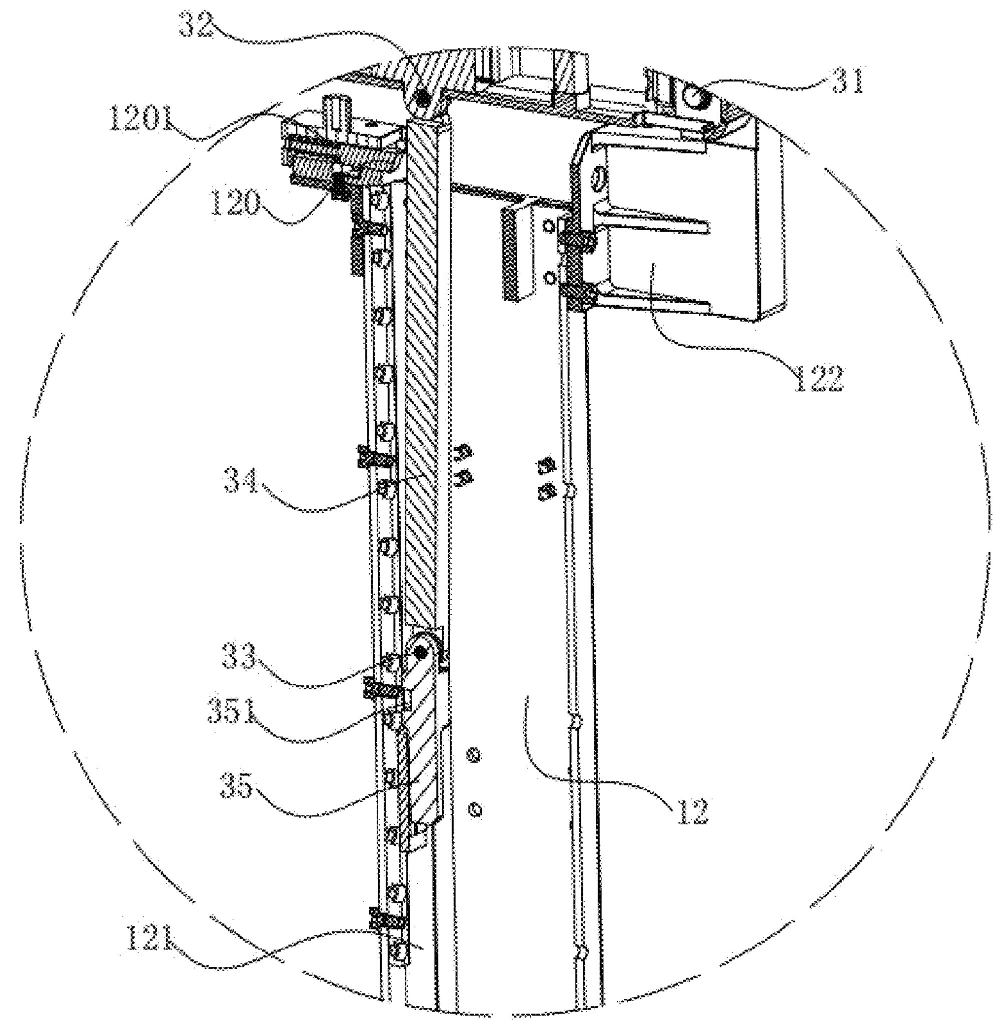
FIG. 2 is an enlarged view of A of FIG. 1.
Figure 3:
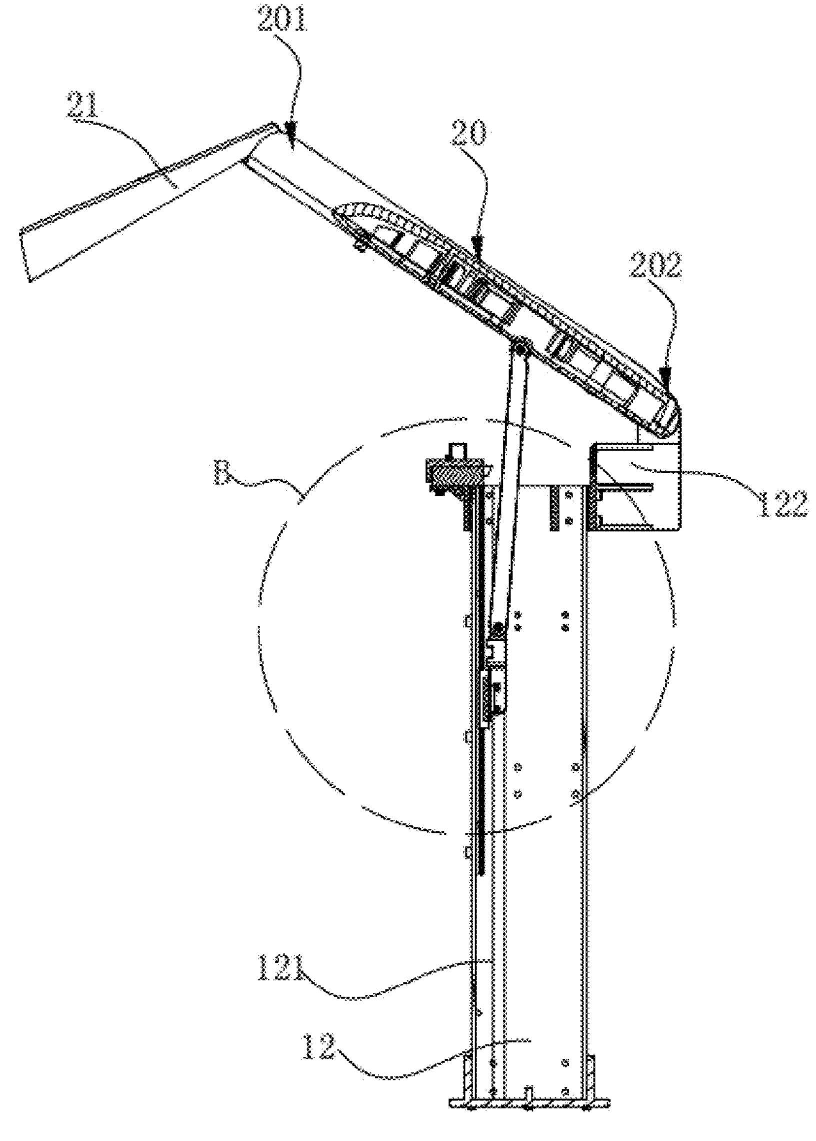
FIG. 3 is a side view of FIG. 1.
Figure 4:
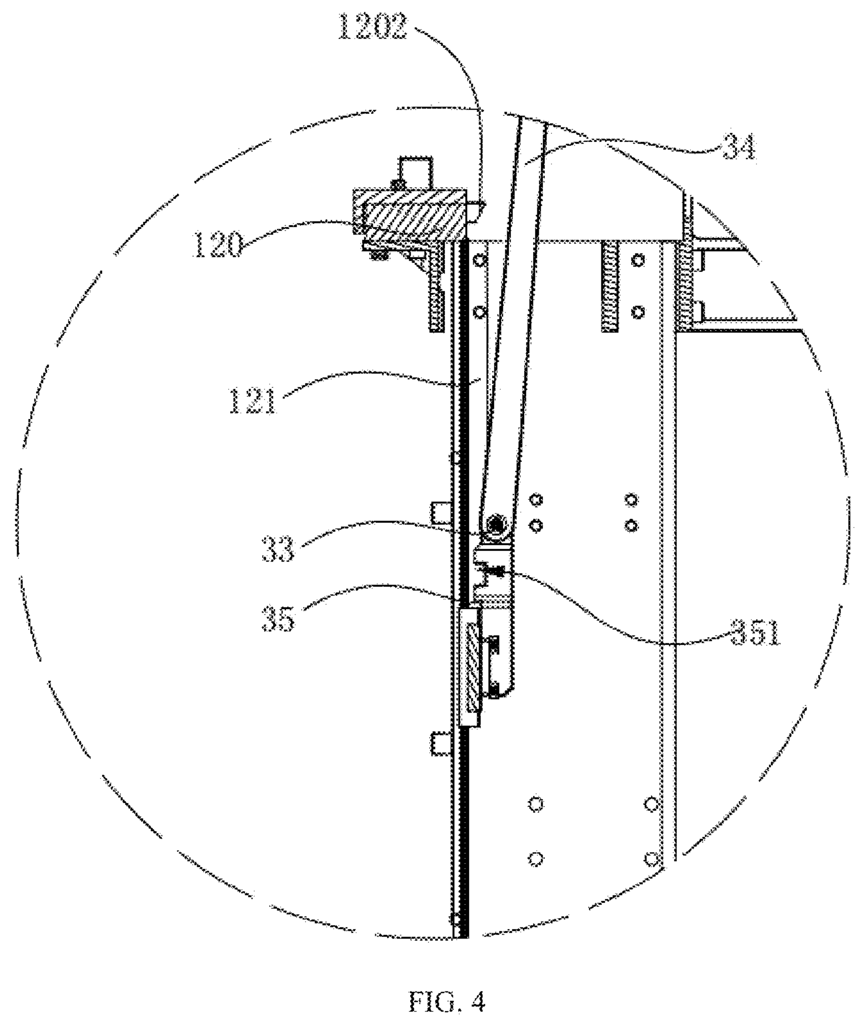
FIG. 4 is an enlarged view of B of FIG. 3.
Figure 5:
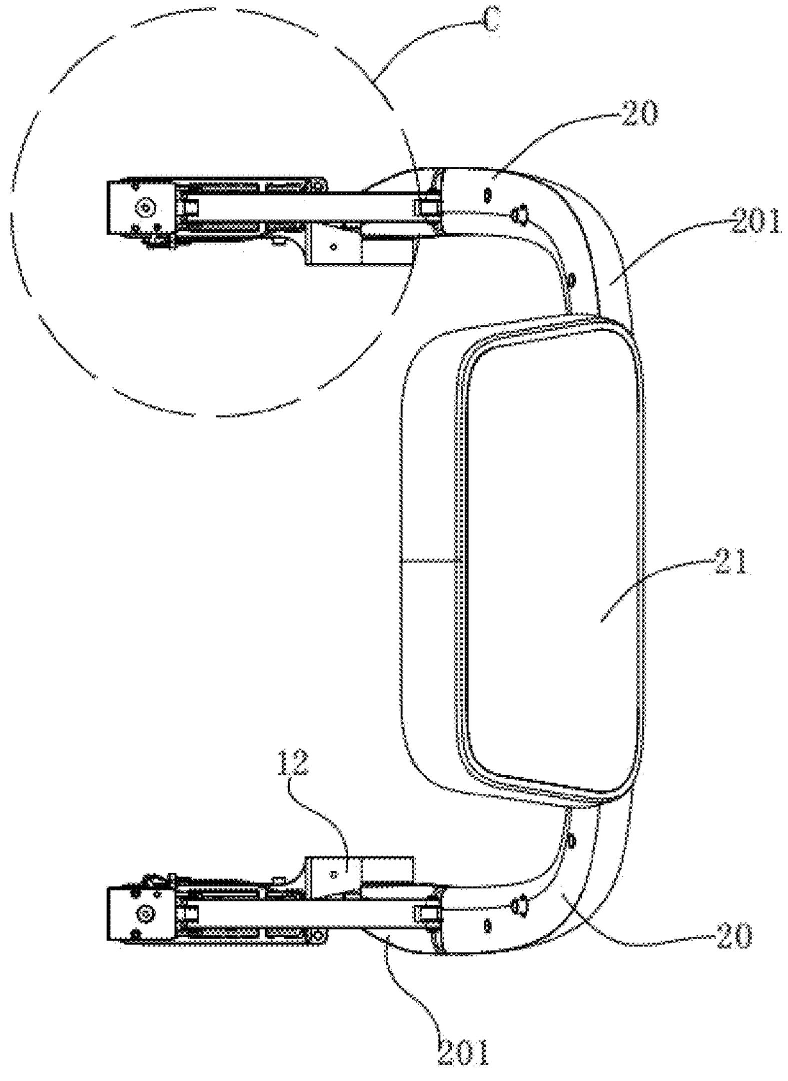
FIG. 5 is a top view of the handrail assembly in an unlocked state.
Figure 6:
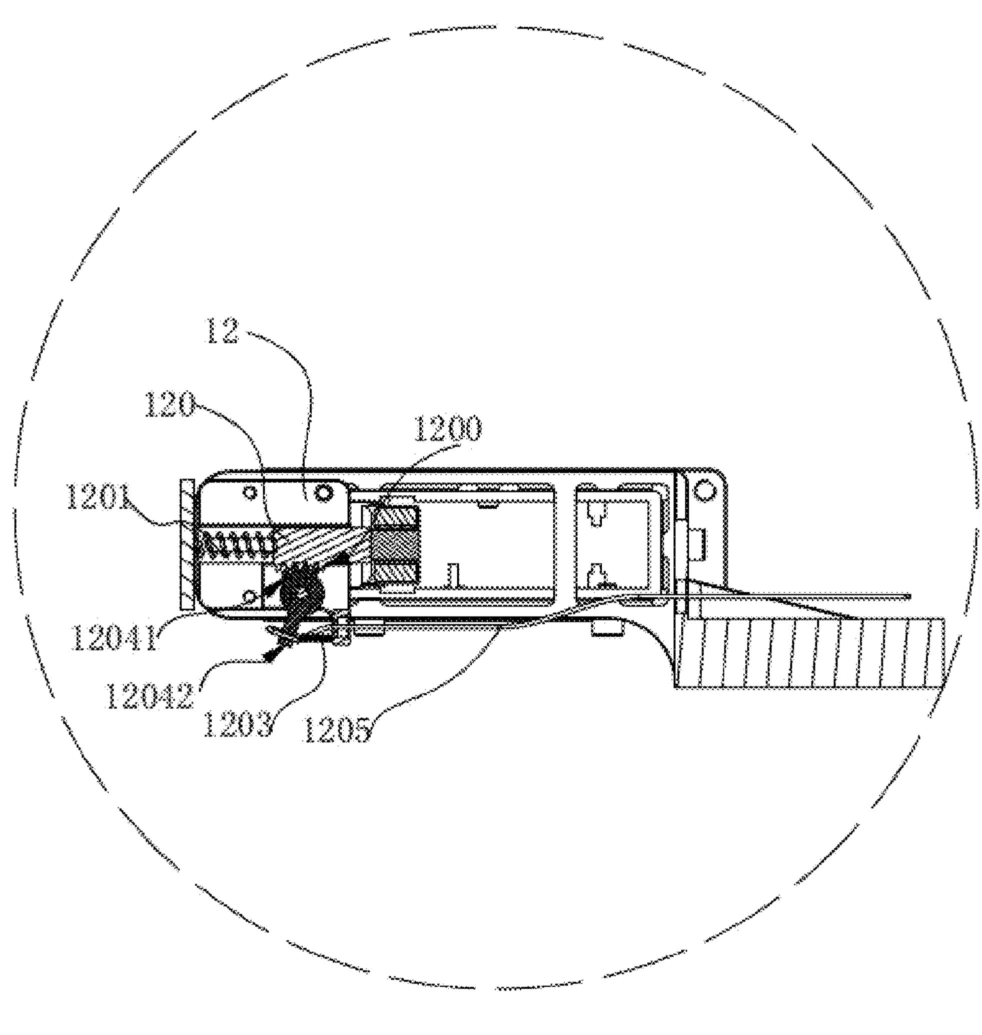
FIG. 6 is an enlarged cross-sectional view of C of FIG. 5.
Figure 7:
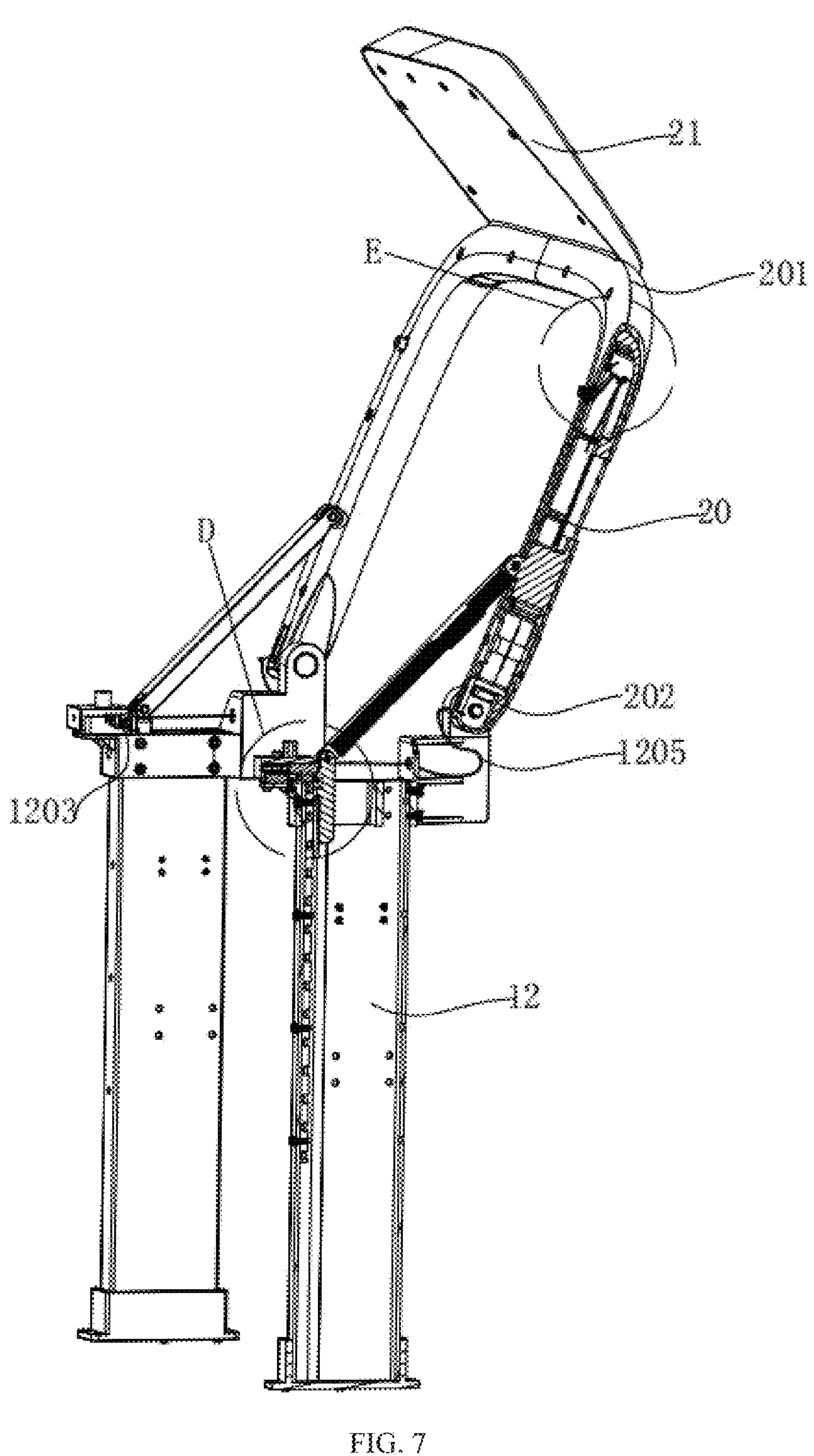
FIG. 7 is a perspective view of the handrail assembly in an unlocked state.
Figure 8:
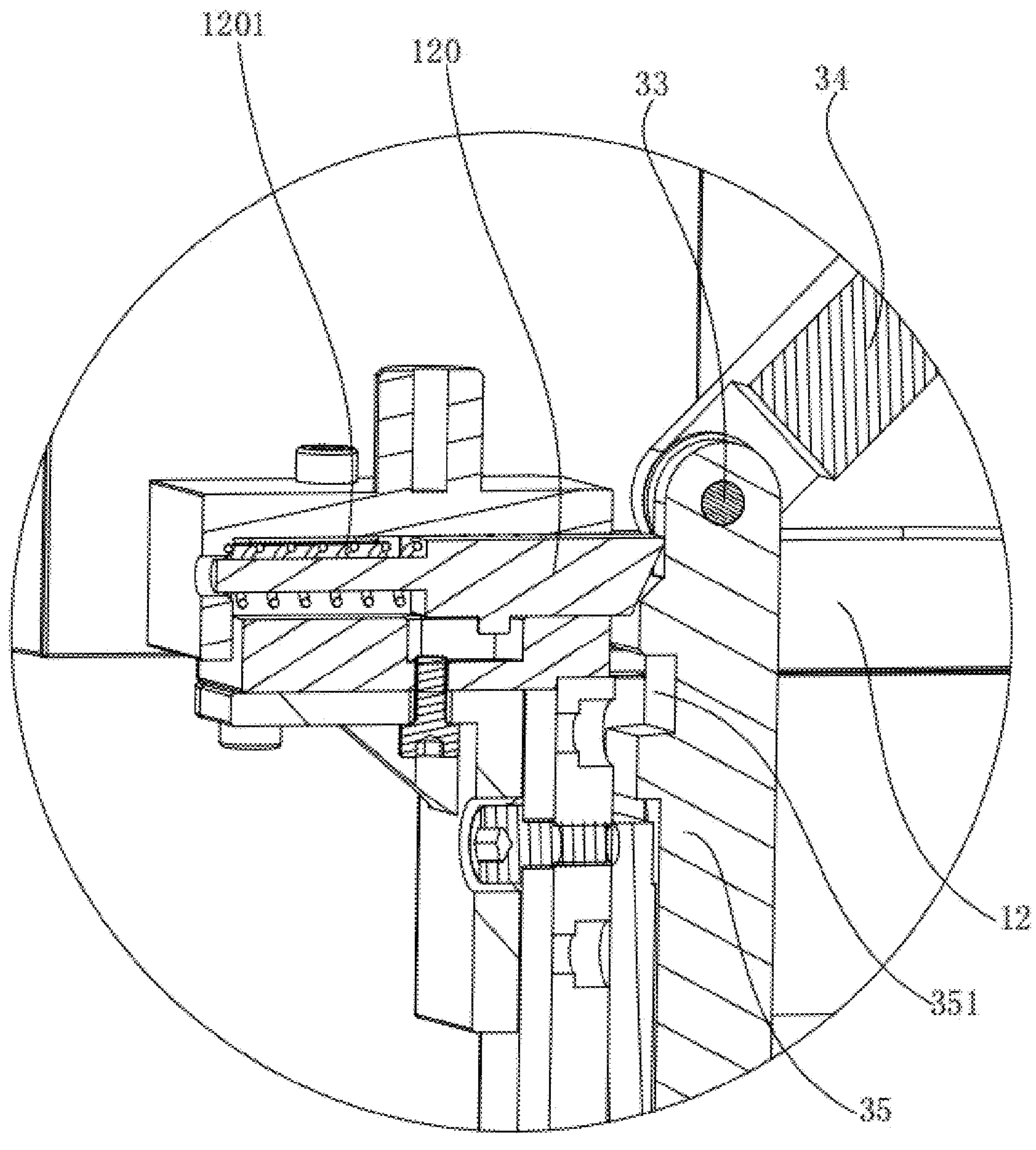
FIG. 8 is an enlarged view of D of FIG. 7.
Figure 9:
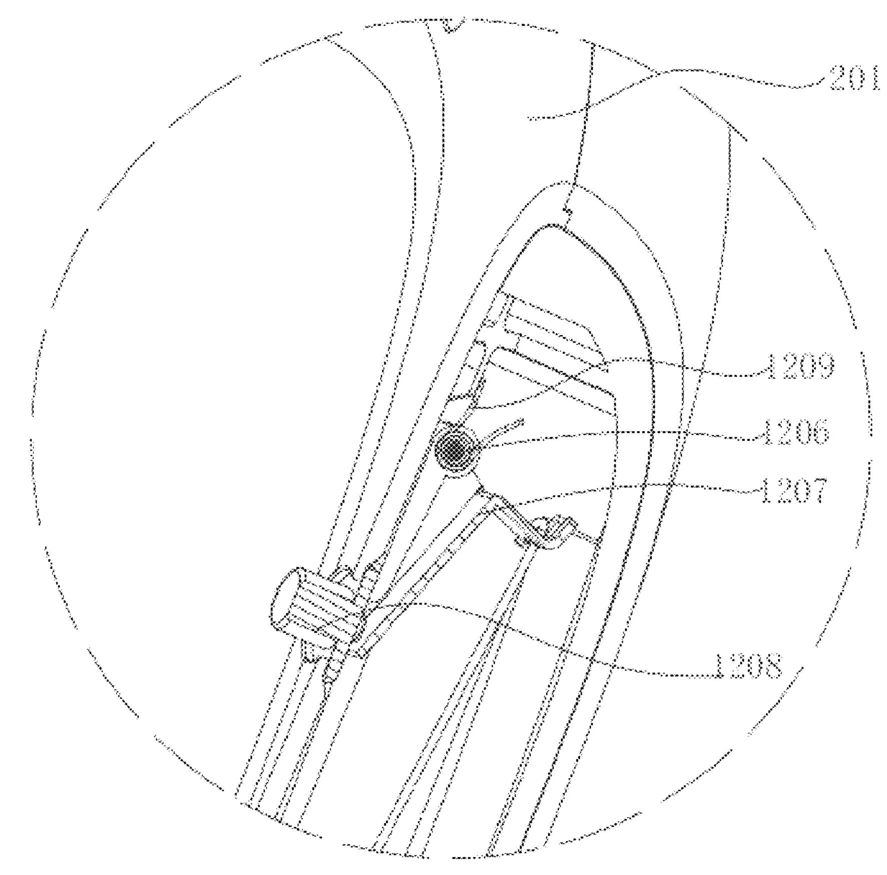
FIG. 9 is an enlarged view of E of FIG. 7.
Figure 10:
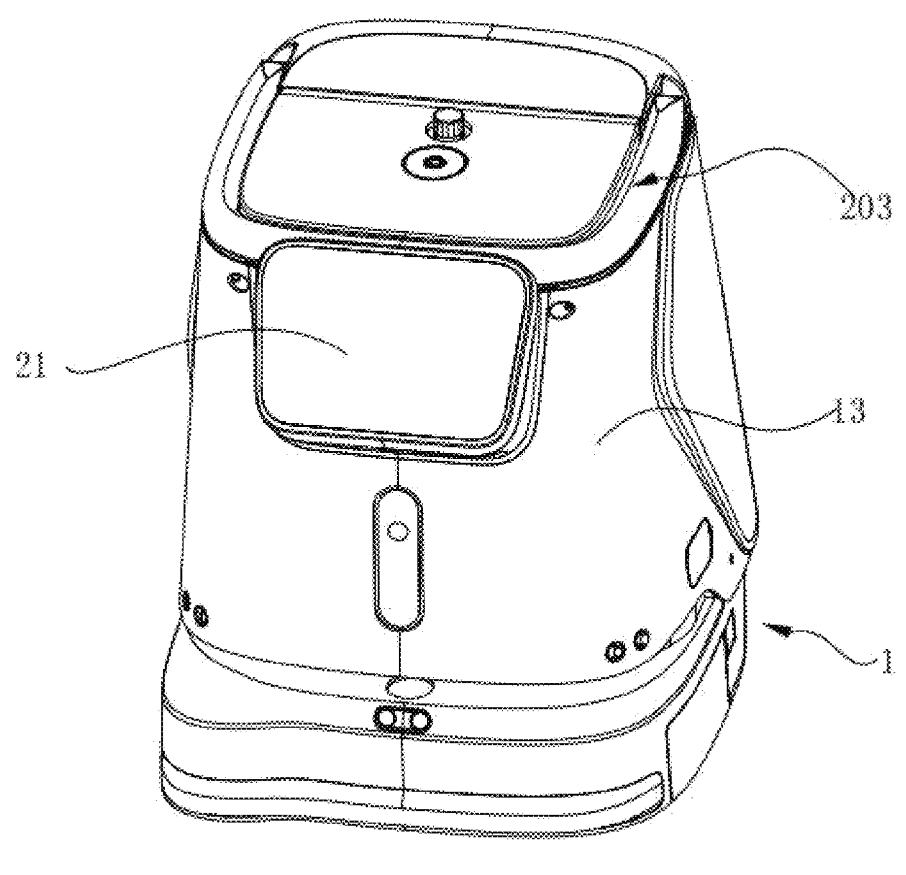
FIG. 10 is a perspective view of the handrail assembly covering on a robot body.
Figure 11:
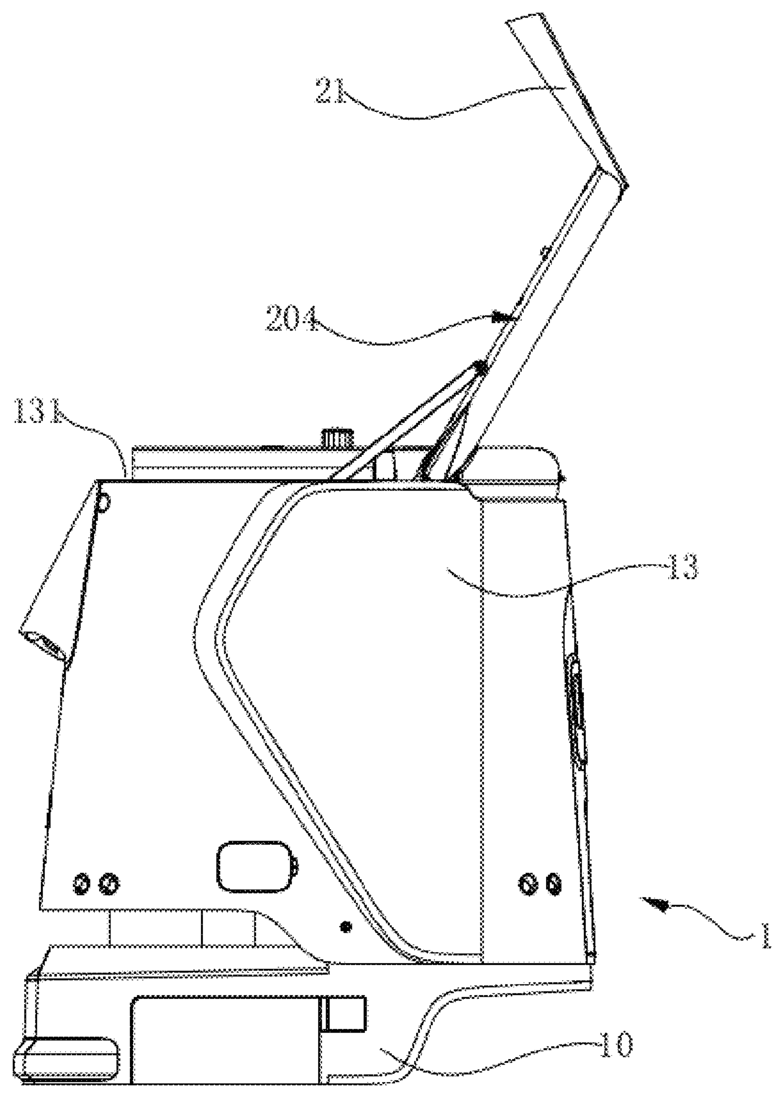
FIG. 11 is a side view of the robot body.
Figure 12:
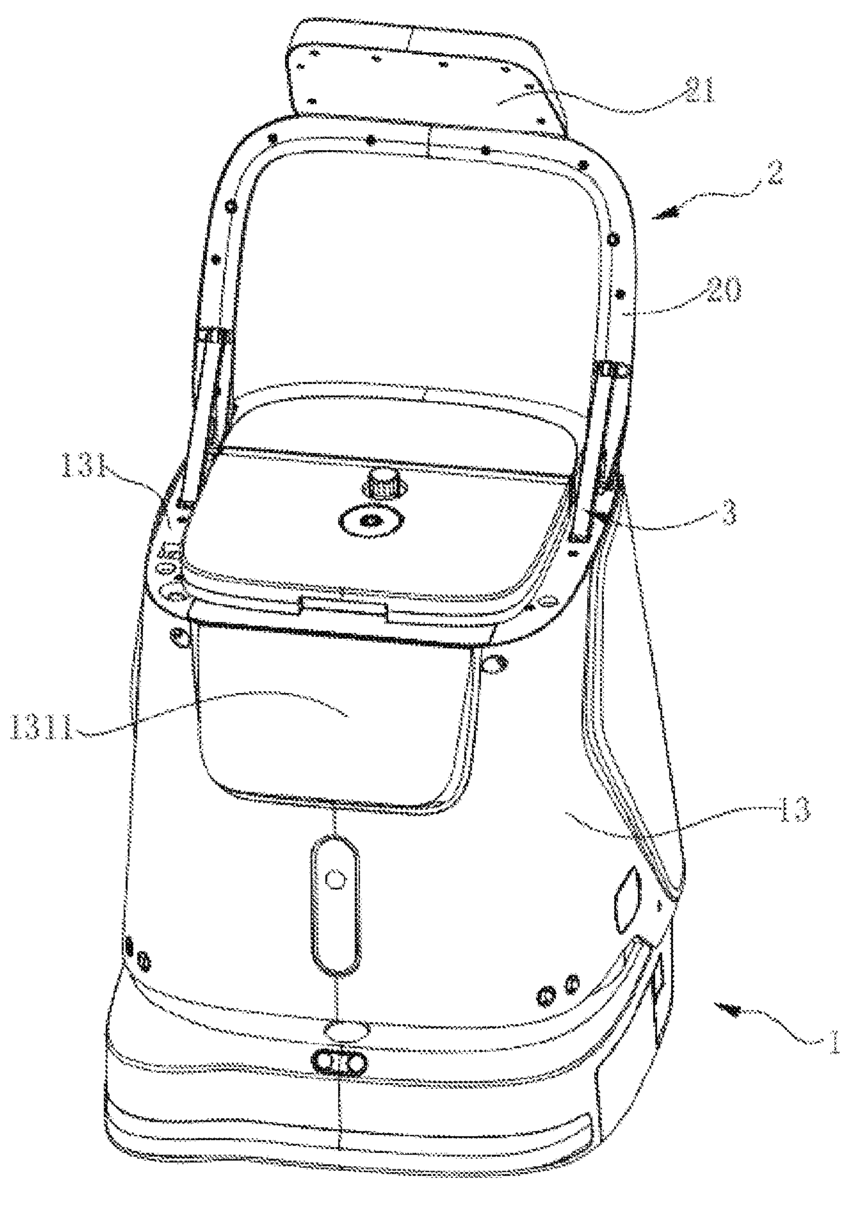
FIG. 12 is a perspective view of the robot body when the handrail assembly is turned.
Figure 13:
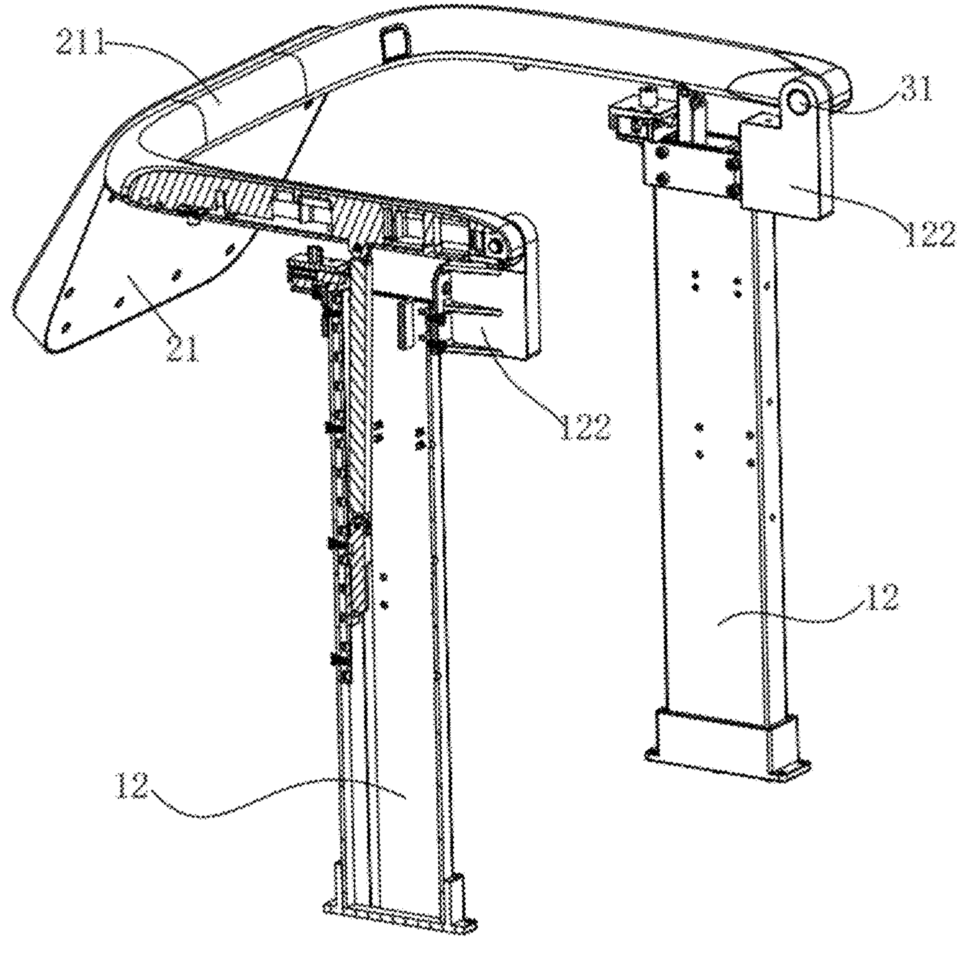
FIG. 13 is a perspective view of FIG. 1 viewed from a second aspect.

1, robot body; 10, chassis; 12, first bracket; 120, locking latch: 1200, rack; 1201, pressure elastic member; 1202, inclined portion; 1203, tensile elastic member; 12042, second assembly end; 1205, traction member: 1206, fourth shaft; 1207, operating portion; 1208, button; 1209, torsion spring; 121, first groove; 122, second bracket; 13, housing; 131, receiving groove: 1311, positioning portion: 2, handrail assembly: 20, connecting member; 201, handrail body: 202, first assembly end; 203, top wall: 204, side wall: 21, display screen; 211, fifth shaft; 3, turning mechanism; 31, first shaft; 32, second shaft; 33, third shaft; 34, sliding rod; 35, sliding tab: 351, locking notch.

DETAILED DESCRIPTION OF THE EMBODIMENTS

In order to facilitate the understanding of the present disclosure, the present disclosure is described more comprehensively below with reference to the relevant accompanying drawings. Preferred embodiments of the present disclosure are shown in the accompanying drawings. However, the present disclosure may be implemented in many different forms and is not limited to the embodiments described herein. On the contrary, the purpose of providing these embodiments is to make the public content of the present disclosure more thoroughly and comprehensively understood.

Unless otherwise defined, all technical and scientific terms used herein have the same meanings as those commonly understood by those skilled in the technical field of the present disclosure. The terms used in the specification of the present disclosure herein are only for the purpose of describing specific embodiments, and are not intended to limit the present disclosure. As used herein, the term "and/or" includes any and all combinations of one or more related listed items.

As shown in FIGS. 1 to 12, a robot provided by a first embodiment of the present disclosure includes a robot body 1, a first bracket 12, a handrail assembly 2, and a turning mechanism 3. The first bracket 12 is mounted in the robot body 1. The handrail assembly 2 includes a connecting member 20, a handrail body 201 provided at an end of the connecting member 20, and a first assembly end 202 provided at another end of the connecting member 20. It should be understood that the first assembly end 202 and the handrail body 201 are arranged opposite to each other at two opposite ends of the connecting member 20, and the handrail body 201 may be in any shape, such as ring shape, strip shape, or arc shape. The turning mechanism 3 includes a first shaft 31. The first assembly end 202 is rotatably connected to the first bracket 12 through the first shaft 31. That is, the first shaft 31 is mounted on the first bracket 12, and the handrail body 201 is connected to the first shaft 31. Optionally, the first shaft 31 can also be replaced with a pivot pin or a hinge. The pivot pin or hinge is sleeved on the first bracket 12, and the handrail body 201 is rotatably connected to the pivot pin or hinge. The handrail body 201 can rotate by a certain angle around an axis of the pivot pin or the hinge under the action of external force.

When the handrail assembly 2 is in a first turning position, the handrail body 201 is away from the robot body 1 to facilitate an operator to push the robot to move. When the handrail body 201 is in a second turning position, the handrail body 201 and the connecting member 20 are attached to the robot body 1. That is, the handrail body 201 can not only be folded for a decorative appearance, but also can assist the operator to push the robot after being turned at a certain angle (it should be understood that the handrail body 201 and the connecting member 20 are always synchronously rotated), and then completes the cleaning task of the robot. Alternatively, when the operator needs to build a usage scene when using the robot for the first time, the handrail body 201 can assist the operator to move the robot to scan the scene. Meanwhile, the foldable handrail has a compact structure and occupies little space, which greatly meets the user's needs for a reversible handrail assembly with aesthetical shape.

In an optional scene, the robot is not convenient for a user to push when building a scene due to the height problem. In the above-mentioned embodiment, by providing the handrail assembly 2, and the handrail assembly 2 can be turned relative to the robot, and the handrail assembly 2 can be higher than the robot body 1, so as to facilitate operations such as pushing the robot, and further, when not in use, the handrail assembly 2 is attached to the robot, which can greatly reduce the occupied space.

In an optional embodiment, the turning mechanism 3 further includes a limiting structure. An end of the limiting structure is connected to an end of the connecting member 20 adjacent to the handrail body 201, that is, the limiting structure is provided at a position away from the first assembly end 202. Another end of the limiting structure is mounted on the first bracket 12, and the limiting structure is configured to limit the handrail body 201 and the connecting member 20 in the first turning position. That is, when the handrail body 201 and the connecting member 20 are turned to the first turning position, the limiting structure can enable the handrail body 201 and the connecting member 20 to be fixed and cannot to be rotated.

In an optional embodiment, the limiting structure includes a second shaft 32, a third shaft 33, a sliding rod 34, a sliding tab 35, and a locking mechanism. An end of the connecting member 20 adjacent to the handrail body 201 is rotatably connected to an end of the sliding rod 34 through the second shaft 32, and another end of the sliding rod 34 is rotatably connected to the sliding tab 35 through the third shaft 33. The first bracket 12 is provided with a first groove 121. The first groove 121 is provided along an extension direction of the first bracket 12. When the handrail body 201 and the connecting member 20 rotate, the sliding rod 34 is driven to rotate at a certain angle and slides along the first groove 121, and when the sliding rod 34 slides, the sliding tab 35 is driven to slide in the first groove 121.

It should be understood that when the handrail body 201 is in the second turning position, and the handrail body 201 and the connecting member 20 are attached to the robot body 1, an initial position of the sliding tab 35 is on an end of the sliding rod 34 away from the connecting member 20. As the handrail body 201 turns (when the handrail body 201 and the connecting member 20 are turned from the second turning position to the first turning position), the sliding tab 35 gradually approaches the limiting structure. Finally, when the handrail body 201 and the connecting member 20 turned to the first turning position, a final position of the sliding tab 35 is a position on the first bracket 12 (first groove 121) adjacent to the connecting member 20.

The locking mechanism is mounted on the first bracket 12. When the handrail body 201 and the connecting member 20 are turned to the second turning position, the handrail body 201 and the connecting member 20 are attached to the robot body 1. The limiting structure is configured to lock the sliding tab 35. It should be understood that the limiting structure limits the sliding tab 35 from sliding along the first groove 121 to the initial position of the sliding tab 35, that is, at the end of the sliding rod 34 away from the connecting member 20. At the same time, the sliding tab 35 is also limited from continuing to slide along the first groove 121 in a direction close to the connecting member 20.

In an optional embodiment, the locking mechanism includes a locking latch 120 and a pressure elastic member 1201. The sliding tab 35 is provided with a locking notch 351, the locking latch 120 is slidably provided on the first bracket 12. The pressure elastic member 1201 is provided between the first bracket 12 and the locking latch 120, that is, the pressure elastic member 1201 provides elastic force for the locking latch 120 to slide, that is, the locking latch 120 is capable of telescoping on the first bracket 12.

It should be understood that a cavity or an opening configured to accommodate the locking latch 120 is provided at a corresponding position of the first bracket 12. When the handrail body 201 and the connecting member 20 are turned to the second turning position, the sliding tab 35 is just opposite to the locking latch 120, and the pressure elastic member 1201 pushes the locking latch 120 to extend out of the cavity accommodating and to be inserted into the locking notch 351, thus completing the fixing of the sliding tab 35, that is, the fixing of the handrail body 201 and the connecting member 20 is completed, thereby assisting the operator to push the robot, and then completing the cleaning task of the robot. When the operator pushes the handrail body 201, the handrail body 201 and the connecting member 20 are prevented from reversely turning back to the second turning position, that is, the handrail body 201 and the connecting member 20 are buckled to the robot body 1.

In an optional embodiment, a side of the locking latch 120 adjacent to the locking notch 351 is provided with an inclined portion 1202. As the handrail body 201 turns (when the handrail body 201 and the connecting member 20 turn from the second turning position to the first turning position), the sliding tab 35 gradually approaches the limiting structure. Finally, when the handrail body 201 and the connecting member 20 are turned to the first turning position, the final position of the sliding tab 35 is a position on the first bracket 12 (first groove 121) adjacent to the connecting member 20, that is, the position is close to the locking latch 120. The inclined portion 1202 is configured to guide the locking notch 351 on the sliding tab 35, so that the sliding tab 35 is in contact with the locking latch 120 and is also subjected to the force of the operator, so that the sliding tab 35 continues to slide along the first groove 121 until the locking latch 120 and the locking notch 351 are engaged with each other, thereby achieving a fixing effect on the handrail assembly 2.

In an optional embodiment, the locking mechanism further includes a rack engaging portion, a traction member 1205, a tensile elastic member 1203, and a traction control assembly. The locking latch 120 is provided with a rack 1200, and the rack engaging portion includes a gear portion 12041 and a second assembly end 12042 that are connected to each other. The gear portion 12041 is rotatably mounted on the first bracket 12, the gear portion 12041 is engaged with the rack 1200, and the traction control assembly is provided on the connecting member 20. The second assembly end 12042 is connected to the traction control assembly through the traction member 1205, and the traction control assembly drives the gear portion 12041 to rotate through the traction member 1205, so as to disengage the locking latch 120 from the locking notch 351.

Optionally, the traction member 1205 is a traction rope, and the traction rope may be located in the connecting member 20. It should be understood that when an end of the traction member is pulled by the traction control assembly, the traction member is forced to retract (i.e., toward the first turning position), and the gear portion 12041 rotates to disengage the locking latch 120 from the locking notch 351, so as to achieve the effect of unlocking the handrail assembly 2.

In an optional embodiment, the traction control assembly includes an operating portion 1207, a fourth shaft 1206, and a torsion spring 1209. Optionally, the operating portion 1207 is rotatably connected to the end of the connecting member 20 adjacent to the handrail body 201 through the fourth shaft 1206. The torsion spring 1209 is sleeved on the fourth shaft 1206, two ends of the torsion spring 1209 abut against the connecting member 20 and the operating portion 1207, respectively, and the operating portion 1207 is connected to the traction member 1205. Optionally, the torsion spring 1209 may also be replaced by a tension spring, or the tension spring and the torsion spring 1209 are provided at the same time, and two ends of the tension spring are connected between the connecting member 20 and the operating portion 1207.

In an optional embodiment, the traction control assembly includes a button 1208, which is fixedly mounted on an end of the operating portion 1207 opposite to an end of the operating portion 1207 connected to the traction member 1205. When the handrail body 201 and the connecting member 20 are turned to the first turning position, the second assembly end 12042 of the rack engaging portion is connected to the traction member 1205. The operator can operate the button 1208 to rotate the operating portion 1207 and the connecting member 20, that is, to overcome the elastic force of the torsion spring 1209. When the operating portion 1207 rotates, another end of the operating portion 1207 drives the gear portion 12041 to rotate through the traction member 1205, so that the locking latch 120 is disengage from the locking notch 351.

It should be understood that when the end of the traction member 1205 is pulled by an end of the operating portion 1207, the traction member 1205 is forced to retract (i.e., toward the first turning position), and the gear portion 12041 rotates to separate the locking latch 120 from the locking notch 351 (the gear portion 12041 rotates to drive the rack 1200 toward the second turning position). That is, the pressure elastic member 1201 will be subjected to a pressure from the rack 1200 in a direction away from the locking notch 351, so that the locking latch 120 is separated from the locking notch 351, thus achieving the effect of unlocking the handrail assembly 2. That is, the operator can operate the handrail assembly 2 again to rotate it from the first turning position to the second turning position, that is, the handrail assembly 2 is buckled to a housing 13.

In an optional embodiment, the handrail assembly also includes a stretching elastic member 1203. An end of the stretching elastic member 1203 is connected to the second assembly end 12042, and another end of the stretching elastic member 1203 is fixed to the first bracket 12. When the operator stops applying pressure to the button 1208, the gear portion 12041 rotates toward the second turning position again due to the elastic force of the stretching elastic member 1203, and at the same time, the elastic force of the torsion spring 1209 will also causes the traction member 1205 to retract to an original state.

In an optional embodiment, the turning mechanism 3 may also be other common structures that can realize overturning, limiting and releasing the limiting. The above embodiment gives a specific example, but does not limit other structures that can achieve the above functions.

In an optional embodiment, the handrail assembly includes a fifth axis 211 and a display screen 21. The display screen 21 is rotatably mounted on the handrail body 201 or the connecting member 20 through the fifth axis 211. It should be understood that the display screen 21 can rotate around the handrail body 201. When the user needs to operate the handrail body 201, the display screen may not face the user due to the angle change. Therefore, the rotatable display screen 21 can be rotated manually by the user to achieve the best display viewing angle, and functional operations can be performed simultaneously when the cleaning machine is moved to perform the cleaning task. Optionally, the display screen 21 may also be detached through the fifth shaft 211. When the display screen 21 is rotatably mounted on the connecting member 20 through the fifth shaft 211, the handrail body 201 may be provided with anti-slip portions conforming to ergonomics, such as anti-slip rubber sleeves, anti-slip ribs and other structures. Correspondingly, there is also a sufficient distance between the anti-slip portion and the display screen 21 to assist the operator to move the robot. Optionally, the display screen can realize the flipping of the screen image through gravity sensing.

In other embodiments, the display screen 21 may also be directly fixed on the handrail body 201, which is not limited herein.

In above-mentioned embodiment, by providing the display screen 21 on handrail body 201, as the handrail body 201 is turned, the display screen 21 can also be turned, and lifted relative to the robot body 1, so that the height of the display screen 21 can be adapted to the height of the user, which is convenient for the user to use without having to squat down to operate the display screen 21.

In an optional embodiment, the robot body 1 includes the housing 13 and a chassis 10. A top portion of the housing 13 is provided with a receiving groove 131. When the handrail body 201 is in the second turning position, the handrail body 201 and the connecting member 20 are adapted to the receiving groove 131. The first bracket 12 is mounted on the chassis 10 and is provided in the housing 13. It should be understood that the housing 13 serves as an appearance surface to hide the first bracket 12, the handrail body 201 is connected to the first bracket 12 through the turning mechanism 3, and the handrail body 201 also serves as an appearance surface. In order to enhance the appearance, the receiving groove 131 is a concave slot. When the handrail body 201 is buckled to the robot, the handrail body 201 and the receiving groove 131 are adapted to each other.

In other embodiments, the robot body 1 further includes a frame located in the housing 13. The first bracket 12 may also be fixed on the frame. The frame is configured to support the housing 13 and maintain the overall stability of the robot. The frame is fixedly mounted on the chassis 10. The robot body 1 further includes a mobile module, which includes a driving wheel and other components. The mobile module is mounted on the chassis 10 and is configured to drive the robot body 1 to move. While the handrail assembly 2 and the robot body 1 are adapted to each other, the handrail assembly 2 can also be turned by a certain angle to serve a handrail component with a certain height and angle. The operator can push the robot through the handrail assembly 2, so as to complete the daily tasks of the robot. After the task is completed, the handrail assembly 2 is turned back to an adapted position on the robot body 1, so as to avoid occupying too much structural space, and at the same time save the packaging space to a certain extent, and reduce the transportation cost.

In an optional embodiment, the housing 13 includes a positioning portion 1311. Optionally, the display screen 21 is symmetrically fixed on the handrail body 201 along a first axis, and the first axis is located at the symmetry line of the robot body 1. When the handrail body 201 is located in the receiving groove 131, the positioning portion 1311 is configured to support the display screen 21. Optionally, a side wall of the positioning portion 1311 is provided with a buffer wall to prevent an outer shell of the display screen 21 from being scratched.

In an optional embodiment, when the handrail body 201 is located in the receiving groove 131, top walls 203 and side walls 204 of the handrail body 201 and the connecting member 20 are coplanar with a surface of the housing 13. That is, side surfaces of the handrail body 201 and the connecting member 20 are blended into the housing 13 as a single unit, which is more aesthetic.

In an optional embodiment, a direction in which the handrail body 201 and the connecting member 20 are turned from the second turning position to the first turning position around the axis of the first shaft 31 is opposite to the direction of forward movement of the robot. That is, it is convenient for the operator to push the robot body 1 forward.

In an optional embodiment, the handrail body 201 and the connecting member 20 may be integrally formed, that is, an end of the connecting member 20 away from the first assembly end 202 is fixed to the handrail body 201. It should be understood that the handrail body 201 and the connecting member 20 can form any shape, such as a ring shape, a strip shape, or an arc shape. The turning mechanism 3 includes the first shaft 31. The first assembly end 202 is rotatably connected to the first bracket 12 through the first shaft 31. That is, the first shaft 31 is mounted on the first bracket 12. The handrail body 201 is connected to the first shaft 31. Optionally, the first shaft 31 can also be replaced with a pivot pin or a hinge. The pivot pin or hinge is sleeved on the first bracket 12, and the handrail body 201 is rotatably connected to the pivot pin or hinge. The handrail body 201 can rotate a certain angle around an axis of the pivot pin or the hinge under the action of external force.

In an optional embodiment, a second bracket 122 is provided on the first bracket 12. The first assembly end 202 is rotatably connected to the second bracket 122 through the first shaft 31, and the second bracket 122 is fixedly mounted on the first bracket 12 through fasteners such as screws.

Figure 14:
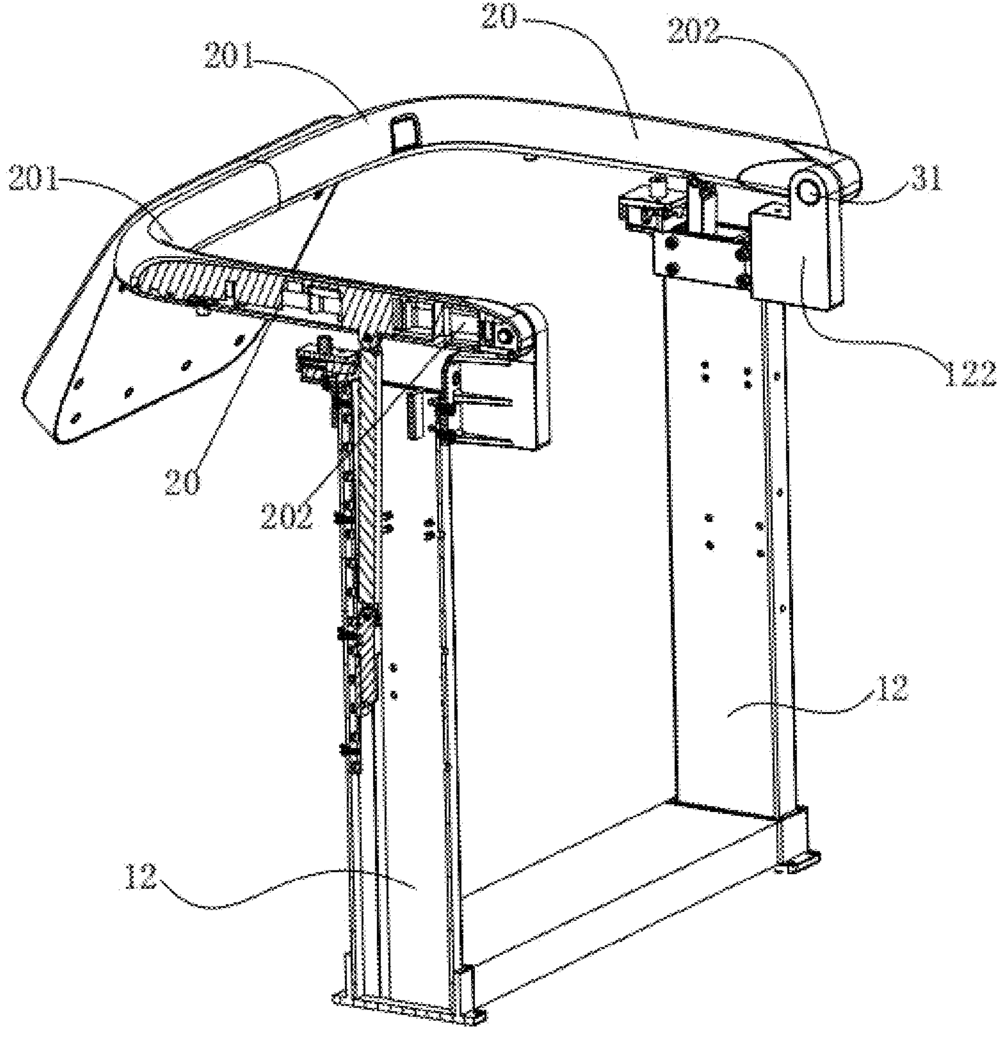
FIG. 14 is a perspective view of the handrail assembly according to a second embodiment of the present disclosure.

As shown in FIG. 14, which shows a perspective view of the handrail assembly according to a second embodiment of the present disclosure. Compared with the first embodiment, the second embodiment has the following differences.

In an optional embodiment, two turning mechanisms 3 are provided, and two first brackets 12 are provided correspondingly. The two first brackets 12 are integrally formed and are symmetrically provided along the first axis. The first axis is located in the plane where the handrail body 201 is located and is perpendicular to a vertical direction. The two first brackets 12 cooperatively form the structure of the frame, and the frame is mounted on the chassis 10. The turning mechanisms 3 are arranged in one-to-one correspondence with the first brackets 12 (i.e., each first bracket 12 is provided with one turning mechanism 3, or both sides of the handrail body 201 are provided with turning mechanisms 3. It should be understood that the handrail body 201 is also symmetrically provided along the first axis, and the two turning mechanisms 3 are respectively located on opposite sides of the handrail body 201, so that the handrail assembly is more stable and able to maintain balance during the turning process, which is more convenient for the user to operate. Optionally, the first bracket 12 may be an integrally formed hardware, which has a firm structure and stronger stability.

In a specific embodiment, the robot provided by the present disclosure may be a cleaning robot, specifically a floor washing robot, a sweeping robot, or an integrated cleaning and sweeping robot, which are not limited herein.

Compared with the first embodiment, the second embodiment has the same structure except that the above structure is different, so it will not be repeated herein.

The robot provided by the present disclosure has the following advantages.

1. The adjustable handrail has a compact structure, takes up little space, and has an aesthetic appearance.
2. The handrail can be turned over at a certain angle according to the scene, so that the operator can push the robot to move.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A robot, comprising:
- a robot body;
- a first bracket mounted in the robot body;
- a handrail assembly comprising a connecting member, a handrail body provided at an end of the connecting member, and a first assembly end provided at another end of the connecting member; an
- a turning mechanism comprising a first shaft, the first shaft being connected to the first assembly end and the first bracket, the handrail body and the connecting member being capable of turning around an axis of the first shaft relative to the robot body
- wherein when the handrail assembly is in a first turning position, the handrail body is away from the robot body, and when the handrail body is in a second turning position, the handrail body and the connecting member are in contact with the robot body;
- wherein the robot further comprises a display screen mounted on the handrail assembly, the robot body comprises a housing and a chassis, a top portion of the housing is provided with a receiving groove, when the handrail body is in the second turning position, the handrail body and the connecting member are adapted to the receiving groove, the first bracket is mounted on the chassis and is provided in the housing, and a side wall of the housing comprises a positioning portion configured to support the display screen when the handrail body is located in the receiving groove.

2. The robot according to claim 1, wherein the turning mechanism further comprises a limiting structure, an end of the limiting structure is connected to an end of the connecting member adjacent to the handrail body, another end of the limiting structure is assembled to the first bracket, and the limiting structure is configured to limit the handrail body and the connecting member in the first turning position.

3. The robot according to claim 2, wherein the limiting structure comprises a second shaft, a third shaft, a sliding rod, and a sliding tab, an end of the connecting member adjacent to the handrail body is rotatably connected to an end of the sliding rod through the second shaft, another end of the sliding rod is rotatably connected to the sliding tab through the third shaft, the first bracket is provided with a first groove extending along an extension direction of the first bracket, when the handrail body and the connecting member rotate, the sliding tab is driven to slide in the first groove, and the sliding tab is configured to limit the handrail body and the connecting member in the first turning position.

4. The robot according to claim 1, wherein the handrail body and the connecting member are integrally formed.

5. The robot according to claim 1, wherein two turning mechanisms are provided, and two first brackets are provided correspondingly, the two first brackets are provided opposite to each other, and the turning mechanisms are arranged in one-to-one correspondence with the first brackets.

6. The robot according to claim 1, wherein when the handrail body is located in the receiving groove, and top walls and side walls of the handrail body and the connecting member are coplanar with a surface of the housing.

7. The robot according to claim 1, wherein a direction in which the handrail body and the connecting member are turned from the second turning position to the first turning position around the axis of the first shaft is opposite to a direction of forward movement of the robot.

8. The robot according to claim 1, wherein the robot is a cleaning robot.

* * * * *